United States Patent

Tanaka et al.

[11] Patent Number: 5,853,094
[45] Date of Patent: Dec. 29, 1998

[54] STOPPER ASSEMBLY FOR A CONTAINER FOR AQUEOUS INFUSION AND A METHOD OF MAKING THEREOF

[75] Inventors: Nobuyuki Tanaka, Kawasaki; Toshio Norimoto, Tokyo; Katushi Shirakawa, Kawasaki; Isao Otake, Kanagawa-ken, all of Japan

[73] Assignee: Showa Denko K. K., Tokyo, Japan

[21] Appl. No.: 647,245

[22] Filed: May 9, 1996

[30] Foreign Application Priority Data

May 25, 1995 [JP] Japan ................................ 7-126753

[51] Int. Cl.$^6$ ..................................... B65D 41/20
[52] U.S. Cl. .................. 215/247; 215/274; 215/275; 215/358
[58] Field of Search ..................... 215/247, 274, 215/275, 355, 358, 361, 362, 364, 297, 300, 320

[56] References Cited

U.S. PATENT DOCUMENTS

| | | | |
|---|---|---|---|
| 4,226,334 | 10/1980 | Weiler et al. | 215/355 |
| 4,254,884 | 3/1981 | Maruyama . | |
| 4,892,222 | 1/1990 | Schmidt et al. | 215/247 |
| 4,967,919 | 11/1990 | Earhart | 215/247 |
| 5,088,612 | 2/1992 | Storar et al. | 215/247 |
| 5,303,835 | 4/1994 | Haber et al. | 215/247 |
| 5,527,580 | 6/1996 | Ikeda et al. | 215/247 X |

FOREIGN PATENT DOCUMENTS

| | | |
|---|---|---|
| 0 079 676 | 5/1983 | European Pat. Off. . |
| 0 172 613 | 2/1986 | European Pat. Off. . |
| 0 509 371 | 10/1992 | European Pat. Off. . |
| 1 558 282 | 2/1969 | France . |
| 2 609 821 | 7/1988 | France . |
| 2121016 | 12/1983 | United Kingdom ................... 215/247 |
| WO 84/03682 | 9/1984 | WIPO . |

OTHER PUBLICATIONS

Patent Abstracts of Japan, vol. 16, No. 21, Jan. 20, 1992; JP-A-90 033250, Oct. 22, 1991.

*Primary Examiner*—Stephen K. Cronin
*Assistant Examiner*—Nathan Newhouse
*Attorney, Agent, or Firm*—Oblon, Spivak, McClelland, Maier & Neustadt, P.C.

[57] ABSTRACT

To provide a rubber stopper enhancing a tightening force applied on a piercing needle and a closing force of a hole caused by piercing the needle, a stopper assembly for a container for aqueous infusion attached to an opening of a main body of a container for aqueous infusion made of synthetic resin in which a rubber stopper is in a tight contact state with a rubber stopper outer supporter made of synthetic resin by receiving a compressive stress therefrom at all the side face of a barrel portion of the rubber stopper, a diameter of at least one of a top face and a bottom face of the rubber stopper is contracted by 1 through 10% and the top face or the bottom face is expanded, is proposed.

15 Claims, 10 Drawing Sheets

STOPPER ASSEMBLY FOR A CONTAINER FOR AQUEOUS INFUSION AND A METHOD OF MAKING THEREOF

BACKGROUND OF THE INVENTION

1. Field of the Invention

The present invention relates to a stopper assembly for a container for aqueous infusion made of synthetic resin which is used in installation aqueous infusion etc. and a method of making thereof, particularly to a stopper assembly dispensing with leakage of liquid in piercing or drawing of a needle for injecting or discharging a aqueous infusion at a rubber stopper portion of a stopper assembly of a container for aqueous infusion or in repetition of these operations.

2. Discussion of the Background

In recent years, a container made of glass and a bottle or a bag etc. made of synthetic resin are widely used as a container for aqueous infusion used in installation, injection or the like. The latter one made of synthetic resin is preferred as a container for aqueous infusion in view of the destruction resistance in transportation, storage or usage thereof.

Meanwhile, a rubber stopper for a container for aqueous infusion is liable to suffer damage deteriorating sealing performance inherent to the rubber stopper in simple piercing of a needle for installation as well as piercing a needle for injecting a medical liquid for instillation while mixing other medical liquid, drawing out a needle in accordance with stoppage of instillation or the like. That is, a tight contact face between a container for aqueous infusion and a rubber stopper receives a large shear stress in piercing and drawing a needle, particularly in repetition of these which deteriorates the tight contact state and liquid leakage is liable to cause. Also, recovery performance of the rubber stopper after drawing the needle is important and if a hole pierce by a needle is not blocked instantaneously after drawing out a needle, liquid leakage is caused.

As stated above, although it is necessary to insert and plug the rubber stopper for piercing a needle for injecting and discharging a aqueous infusion to an opening portion of a container for aqueous infusion, there is a limitation in the conventional technology in plugging it to a degree by which the liquid leakage phenomenon is not caused by piercing, detachment or repetition operation of these of a needle for injecting and discharging aqueous infusion.

In recent times various proposals have been made to meet the above-mentioned request with regard to the rubber stopper.

There have been introduced technologies in which, in view of melting and integrating a rubber stopper to an opening portion at a main body of a container for aqueous infusion made of synthetic resin, a rubber stopper laminated with a film made of synthetic resin is used, the laminated portion is gripped by a supporter made of synthetic resin and a stopper assembly constituted by melting and adhering the film for lamination to the supporter is molten and adhered to the opening portion of the main body of the container for aqueous infusion thereby preventing liquid leakage (for example, Japanese Unexamined Patent Publication No. 1275/1990, Japanese Unexamined Patent Publication No. 205141/1991, Japanese Unexamined Patent Publication No. 84275/1993).

Firstly, Japanese Unexamined Patent Publication No. 1275/1990 discloses a stopper assembly in which recess portions are provided around respective peripheral portions of top and bottom faces of a rubber stopper laminated with a film made of synthetic resin and the rubber stopper is pinched by an outer supporter having protruded ribs fitted to these recess portions. As a method of pinching in this case, the rubber stopper is pinched from top and bottom by the outer supporter previously split in two top and bottom members and thereafter the two members are molten and integrated, or the rubber stopper is fixed in an injection die and the outer supporter is injection-molded all at once thereby having the stopper pinched by the outer supporter.

Meanwhile, Japanese Unexamined Patent Publication No. 205141/1991 and Japanese Unexamined Patent Publication No. 84275/1993 propose methods in which, in pinching and integrating outer peripheral portions at top and bottom faces of a rubber stopper laminated with a film with an outer supporter made of synthetic resin, the outer supporter made of synthetic resin is split into two inner and outer cylindrical bodies etc. and the laminated rubber stopper is pinched by the split outer supporter by also using an injection molding step thereby integrating them by thermal melting.

In the above-mentioned conventional methods, the outer peripheral portions of the rubber stopper are pinched by the outer supporter made of synthetic resin and split in two portions and thereafter, the stopper assembly is made by thermal melting of both by which the stopper assembly can be fixed in liquid tight at a location proximate to the opening portion of the main body of the container for aqueous infusion. Accordingly, the object of solid fixing of the rubber stopper is achieved. However, concerning various stresses received by the rubber stopper in the stopper assembly, firstly in case where the outer peripheral portions of the rubber stopper are pinched from top and bottom by the outer supporter in a closed-ring form split in two portions, the rubber stopper receives a compressive stress by the pinching and the compressive stress produces a tensile stress in the rubber stopper from a center of a portion surrounded by the pinched portions toward to a direction to the pinched portions at the peripheral portions. The tensile stress is apparently considerable particularly at the top face or the bottom face of the rubber stopper which operates in direction of lowering elasticity tightening a needle when the needle for a container for aqueous infusion is pierced.

Further, in respect of a method in which a rubber stopper is previously inserted in an injection die and is fixed by a die for press-fixing having a smooth pressing face and synthetic resin for molding an outer supporter is injected into a die cavity thereby molding a rubber stopper outer supporter integrated with the rubber stopper, the rubber stopper outer supporter is molded while the rubber stopper is holding a more or less flattened state by receiving a compressive stress for pinching and fixing the rubber stopper in the top face/bottom face direction. A tensile stress toward outer peripheral direction is generated in the rubber stopper by the compressive stress which gives rise to the same situation as in pinching by the above-mentioned outer supporter comprising two portions, such as lowering of tightening force of a piercing needle etc.

Meanwhile, a trial such as promoting holding performance of a piercing needle by fitting a ring around one end of a rubber stopper thereby compressing and contracting the rubber stopper by the compressive stress has been disclosed (Japanese Unexamined Utility Model Publication No. 106236/1990). However, in this technology a special ring for compressing and contracting only the top face side of the rubber stopper is forcibly fitted thereto which is substantially a method where the ring is fitted by providing a step difference on the top face side by cutting in the side face of a barrel portion of the rubber stopper. Further, a highly rigid material is required for the ring which gives rise to thickening of the ring, easy detachment thereof etc. Anyway, in this method the rubber stopper is accompanied by even abnormal deformation by a compressive stress applied only at a portion on the top face side in the side face, for example, deformation such as expansion of portions of the side face other than the portion at the top face side, an increase in diameter etc. and therefore, complexity in respect of fitting the ring is unavoidable as in the plug per se to a container for aqueous infusion becomes difficult, stability of piercing performance of a needle is not provided, or the like, which is not a preferable method.

According to these conventional methods, the problems in which a tightening force inherent to a rubber stopper is lowered, specifically a needle holding force in a piercing state of a needle for a container for aqueous infusion or a strong blocking force of a hole after drawing out a needle is lowered and stability of needle piercing performance is deficient etc., have not been solved.

SUMMARY OF THE INVENTION

It is an object of the present invention to provide a rubber stopper strongly attachable to an opening of a main body of a container for aqueous infusion, as well as not deteriorating elasticity inherent to the rubber stopper in which a force tightening a pierced needle or a force to close holes caused by piercing of needles is further enhanced. Also, it is an object of the present invention to provide a method by which abnormal deformation of a rubber stopper is not caused irrespective of compressive stress from a side face of the rubber stopper.

As a result of an intensive research to solve the above-mentioned problem, the inventors found that a force tightening a needle in piercing it or a force strongly closing holes after drawing out needles was enhanced by integrating a rubber stopper and an outer supporter made of synthetic resin and at that occasion decreasing (contracting) the diameter of the rubber stopper by providing the rubber stopper with a compressive stress from all the side face of a barrel portion thereof toward the center direction and completed the present invention. That is, the gist of the present invention is as follows.

1. A stopper assembly for a container for aqueous infusion attached to an opening portion of a main body of a container for aqueous infusion made of a synthetic resin and having a cylindrical rubber stopper and a rubber stopper outer supporter, wherein at least all of a side face of a barrel portion of outer peripheral portions of a top face and a bottom face and all of the side face of the barrel portion of the rubber stopper is in tight contact with the rubber stopper outer supporter made of a synthetic resin by receiving a compressive stress therefrom, at least one of diameters of the top face and the bottom face of the rubber stopper is contracted by 1 through 10% and a portion of the top face in contact with air or a portion of the bottom face in contact with a liquid is deformed to expand out.

2. The stopper assembly for a container for aqueous infusion according to aspect 1, wherein an extruded portion having a diameter larger than the diameters of the top face and the bottom face is provided around a central portion at the side face of the barrel portion of the rubber stopper.

3. The stopper assembly for a container for aqueous infusion according to aspect 1 or aspect 2, wherein a ring-like rib is provided at an outer periphery of a portion of the bottom face of the rubber stopper in contact with a liquid or an outer periphery of a portion of the top face in contact with air.

4. The stopper assembly for a container for aqueous infusion according to any one of aspect 1 through aspect 3, wherein a ring-like recess groove is provided at the outer peripheral portion of at least one of the top face and the bottom face of the rubber stopper and the outer peripheral portions of the top face and the bottom face of the rubber stopper and all of the side face of the barrel portion receive the compressive stress from the rubber stopper outer supporter.

5. The stopper assembly for a container for aqueous infusion according to any one of aspect 1 through aspect 4, wherein a film made of a synthetic resin is laminated on at least the bottom face of the bottom face and the side face of the barrel portion of the rubber stopper and the film and the rubber stopper outer supporter are molten and adhered together at at least one portion of the rubber stopper and the rubber stopper outer supporter in tight contact with each other.

6. A method of making a stopper assembly for a container for aqueous infusion in which a stopper assembly having a rubber stopper and a rubber stopper outer supporter and attached to an opening portion of a main body of a container for aqueous infusion made of synthetic resin is molded by an insert injection molding, wherein a die for the insert injection molding comprising at least two split dies and having gates for injection molding of the rubber stopper outer supporter, vent holes for injection molding and suction holes for fixing the rubber stopper for sucking and fixing at least one of a top face and a bottom face of the rubber stopper and in which a flattened recess portion having a size coverable by the opposed and contracted top face or bottom face of the rubber stopper is formed at at least one of central portions of die faces opposed to the top face and the bottom face of the rubber stopper is used, at least one of the top face and the bottom face of the rubber stopper is contracted by 1 through 10% while sucking and fixing the rubber stopper to the die faces and the rubber stopper outer supporter is formed by an injection pressure sufficient for deforming the stopper to expand to the flattened recess portion.

7. The method of making a stopper assembly for a container for aqueous infusion according to aspect 6, wherein the rubber stopper is positioned by providing a ring-like rib at an outer peripheral portion at a portion of the bottom face of the rubber stopper in contact with a liquid and by fitting the ring-like rib to a ring-like groove for positioning an inserted object provided at a split mold.

8. The stopper assembly for a container for aqueous infusion according to aspect 6 or aspect 7, wherein a rubber stopper in which a film made of a synthetic resin is laminated on at least the bottom face of the bottom face and a side face of a barrel portion of the rubber stopper is used.

9. The method of making a stopper assembly for a container for aqueous infusion according to any one of aspect 6 through aspect 8, wherein a split mold in which a plurality of gates for an injection molding are provided on a plane outside of the barrel portion of the inserted rubber stopper and in parallel with the top face or the bottom face of the rubber stopper is used.

10. The method of making a stopper assembly for a container for aqueous infusion according to any one of aspect 6 through aspect 9, wherein a die in which at least one of die faces in contact with a portion of the top face of the rubber stopper in contact with air and a portion of the bottom face thereof in contact with a liquid and the flattened recess portion of the die is rendered an insertion die is used.

11. The method of making a stopper assembly for a container for aqueous infusion according to aspect 10, wherein suction holes for fixing the rubber stopper or vent holes for deforming to expand out the rubber stopper is provided at at least one of the insertion dies.

12. The method of making the stopper assembly for a container for aqueous infusion according to aspect 10 or aspect 11, wherein the insertion die is metal particles sintered body.

DETAILED DESCRIPTION OF REFERRED EMBODIMENTS

Figure 1:
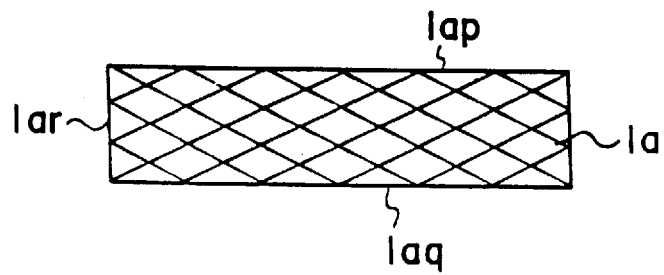
FIG. 1 is a sectional view of a cylindrical rubber stopper.

A detailed explanation will be given of the content of the present invention as follows.

It is sufficient that rubber stoppers used in the present invention including ones used for stopper assemblys of a conventional container for aqueous infusion, are provided with resistance against used aqueous infusion. However, in practice rubber stoppers comply with prescriptions of the test method of plastic container for aqueous infusions and the aqueous infusion rubber stopper test method in accordance with the Japanese Pharmacopoeia.

Although tight contact between a rubber stopper and a rubber stopper outer supporter is achieved if the rubber stopper receives a compressive stress provided in the rubber stopper outer supporter from all the side face of its barrel portion, the above-mentioned tight contact becomes further effective if a rubber stopper laminated with a film made of synthetic resin is used and thermal melting and adherence between the film and the rubber stopper outer supporter is carried out.

Although the film made of synthetic resin is effective in view of liquid tight sealing by melting adherence of a rubber stopper and a rubber stopper outer supporter as mentioned above, if the film is present on the bottom face, that is, a face in contact with a aqueous infusion, elusion of components of the rubber stopper by the aqueous infusion can be restrained and accordingly, the film is a useful means in this respect.

Although methods for manufacturing a rubber stopper laminated with the above-mentioned film made of synthetic resin are not particularly restricted, a method in which an unbridged rubber material is put between synthetic resin films (for example, method described in Japanese Unexamined Patent Publication No. 1275/1990) or a method in which the material is made flow on the films and the rubber stopper is formed simultaneously with bridging, is simple and preferable. However, considering contact relationship between a rubber stopper and a rubber stopper outer supporter and contact relationship between the rubber stopper and a aqueous infusion, it is preferable that the film is laminated at least on the bottom face. Further, it is more preferable in view of liquid tight sealing performance that it is laminated on the side face of a barrel portion of the rubber stopper.

Also, although it is necessary that the film made of synthetic resin used here, is made of a material having melting adherence performance with a rubber stopper outer supporter or has resistance against aqueous infusion, when the former of the melting adherence performance is particularly required, polyethylene, polypropylene, ethylene/vinyl acetate copolymer etc. can be exemplified and if the latter of the aqueous infusion resistance is particularly required, polyester, polytetrafluoroethylene etc. can preferably be used. When both performances are required, polyethylene, ploypropylene etc. are particularly preferable.

Further, although the thickness of the film for lamination is not particularly restricted, substantially 10 through 100

μm is preferable considering easiness in lamination and melting adherence force.

A method achieving mechanical integration of a rubber stopper and a rubber stopper outer supporter is preferably adopted since a tight contact face of the rubber stopper and the rubber stopper outer supporter always receives a shear exfoliation stress in piercing or drawing a needle.

The mechanical integration capable of considerably opposing the above-mentioned shear exfoliation stress can be obtained by providing an extruded portion having a desired width of which diameter is larger than those of the top face and the bottom face around the rubber stopper at its center of the side face of the barrel portion. The center of the side face of the barrel portion mentioned here signifies that the center of the protruded portion is present in the vicinity of the center of the side face of the barrel portion and needs not to be located at an accurate central position. Although the width and the height of the protruded portion are not particularly restricted, it is particularly preferable in view of the shear exfoliation stress that the protruded portion is provided with a trapezoidal section. A rubber stopper having a shape comprising a top face of a smaller diameter and a bottom face of a larger diameter by forming a protruded portion around the side face of the barrel portion with a face thereof formed as sharing with the bottom face, can preferably be used in place of the one having the above-exemplified shape. Also in this case the film is laminated on a desired face such as on the bottom face, the bottom face and the side face of the extruded portion, only the side face of the barrel portion etc.

Although the rubber stopper outer supporter may be formed only on the side face of the barrel portion of the rubber stopper, the integration of both is more enhanced by forming a reinforcement frame extended from the side face of the barrel portion to outer peripheral portions of the top face and/or the bottom face of the rubber stopper and reaching ring-like recess grooves provided at the outer peripheral portions.

When a ring-like rib is provided along an outer periphery of a portion of the bottom face of a rubber stopper in contact with a liquid or an outer periphery of the top face thereof in contact with air, the ring-like rib is useful in positioning the rubber stopper on a die face in an insert injection molding, mentioned later. The formation of the ring-like rib per se operates as a rib preventing deformation of the rubber stopper which is a preferable embodiment.

Although a method in which a rubber stopper receives a compressive stress from a rubber stopper outer supporter on all the side face of the barrel portion and the top face or the bottom face of the rubber stopper is contracted, is not particularly restricted, in a method of forcibly inserting the rubber stopper into a rubber stopper outer supporter having an inner diameter smaller than the outer diameter of the rubber stopper, the larger the difference therebetween, the more difficult is the inserting operation. However, the object can simply be achieved by a method of a so-called insert molding in which a rubber stopper is previously inserted into split molds and a rubber stopper outer supporter is injection-molded on all the side face of the barrel portion or all the side face of the barrel portion and outer peripheral portions of the top face and the bottom face, which is preferable.

In this case, even if the rubber stopper receives a compressive stress on all the side face of the barrel portion etc., it is impossible to achieve deformation of the rubber stopper by a reduction in volume in which only diameter contraction of at least one of the top face and the bottom face as designated by the present invention is accompanied since the volume of the rubber stopper per se is invariable. Therefore, in reducing the volume of the top face or the bottom face portion by the diameter contraction, an increase in volume in the other portion of the rubber stopper, that is, volume displacement is resulted.

According to the present invention, the volume reduction based on the compressive stress from all the side face of the barrel portion of the rubber stopper etc. is resolved by increasing the volume at the top face or the bottom face in the vertical direction, that is, by causing a phenomenon called as expansion deformation.

However, although the higher the compressive stress the more preferable it is in view of preventing liquid leakage in piercing or drawing of a needle into or from the rubber stopper of the container for aqueous infusion or in repeating these operations, which is an original object of the present invention, when the diameter contraction of the rubber stopper is increased and the tightening force becomes excessive, the operation per se of piercing and drawing a needle becomes difficult which may hamper aqueous infusion operation.

It is necessary in consideration of these points that according to the present invention the diameter contraction of the top face or bottom face of the rubber stopper is in a range of 1 through 10% of diameter, preferably 2 through 8%, more preferably 3 through 6%. In this case if the diameter contraction is less than 1% of diameter a desired effect cannot be provided and liquid leakage phenomenon is observed as in the conventional case. By contrast, when it exceeds 10%, considerably large force is required in piercing or drawing of a needle to or from the rubber stopper which hampers the aqueous infusion operation as mentioned above, which is not preferable. It is more effective that the range is 2 through 8% in view of the above-mentioned liquid leakage resistance and the operational performance. The most preferable range of the diameter contraction is 3 through 6% in overall view.

A stopper assembly for a container for aqueous infusion in accordance with the present invention comprises a rubber stopper or a rubber stopper laminated with a film made of synthetic resin and a rubber stopper outer supporter as constituent elements. If the rubber stopper outer supporter is constituted by a structure in which it is further extended from the bottom face along the side face of the barrel portion of the rubber stopper and a ring-like rib extruding outwardly is formed at the distal end as a flange, by providing a flange also to an opening of a container for aqueous infusion main body that is made of synthetic resin, the coupling of both is facilitated. Methods of melting and adhering normally conducted in a synthetic resin molded body such as ultrasonic wave adhesion or the like, is applicable to the coupling of both. Further, a stopper assembly formed only on the side face of the barrel portion of the rubber stopper without extending the rubber stopper outer supporter as mentioned above, or a stopper assembly in which the rubber stopper outer supporter is formed on the side face of the barrel and is extended from the side face of the barrel portion to the outer peripheral portions along the top face and the bottom face of the rubber stopper in a rib-like shape thereby forming a reinforcement frame, can be formed. In this case a method in which the stopper assembly is inserted into a portion for receiving the stopper assembly which has previously been formed at an opening of a container for aqueous infusion main body made of synthetic resin and both are molten and adhered in liquid tight by public-known various melting and adhering means, can be adopted as an effective method.

Further, the rubber stopper outer supporter is required to have compressive fixing force applied on the rubber stopper, shape stability (rigidity) in piercing or drawing of a needle, tight contact with the rubber stopper or the laminated film, chemical resistance against aqueous infusions as well as mountability to the opening of the container for aqueous infusion main body and therefore, the material must satisfy in overall these various points. Accordingly, these points depend on selection of material in components of contact faces such as laminated film etc. and mechanical properties such as the above-mentioned compressive fixing force etc. depend on rigidity of itself and are controllable also by the thickness. Therefore, although not specified, in consideration of chemical resistance, thermal formability etc., high-density polyethylene, low-density polyethylene, linear low-density polyethylene, polypropylene, ethylene-propylene copolymer, polyester, polytetrafluoroethylene etc. are preferable and particularly preferably used are high-density polyethylene, low-density polyethylene, linear low-density polyethylene, polypropylene and ethylene-polypropylene copolymer.

The present invention also provides a method of making a stopper assembly having a rubber stopper and a rubber stopper outer supporter and particularly discloses a method in which a rubber stopper is previously inserted into split dies and a rubber stopper outer supporter is injection-molded.

According to the method of making a stopper assembly in accordance with the present invention, a rubber stopper is previously inserted into a die and its top face or bottom face is tacked to the surface of the die to position the rubber stopper. As a method of tacking it for positioning, suction holes for fixing the rubber stopper are opened on the surface of a die opposing the top face or the bottom face of the rubber stopper and the rubber stopper is sucked and fixed at a predetermined position on the surface of the die. The positioning is more facilitated and preferable in a method in which a ring-like groove is provided at a predetermined location of a die and a ring-like rib provided along an outer periphery of the top face or the bottom face of the rubber stopper is inserted thereinto. Further, according to the present invention a method of contracting the diameter of the rubber stopper by compressing it from all the face of the barrel portion is adopted and therefore, it is necessary that the width of the above-mentioned ring-like groove is rather widened toward the center direction of the ring-like rib such that the above-mentioned ring-like rib can also be contracted in adopting the method of fitting the ring-like rib.

It is preferable that with regard to the positional relationship between a die face at which the rubber stopper is positioned and a die face opposing thereto, they are at positions substantially leaving a gap of approximately 0.2 through 0.4 mm therebetween in case where there is no flattened recess, mentioned later. The reason is that it is preferable to leave a deformation space for the rubber stopper when the rubber stopper is compressed from the side face of the barrel portion and that there is no danger of invasion of resin in injection molding of the rubber stopper outer supporter when substantially the above-mentioned gap is provided.

When there is the flattened recess, the opposing die faces may be in contact therewith.

A flattened recess portion having a size to a degree coverable by the bottom face or the top face of the contracted rubber stopper is formed on the die face to which the rubber stopper is tacked or the opposing die face, constituting a location for the rubber stopper to deform to expand by compression from the side face of the barrel portion of the rubber stopper in injection molding.

When the above-mentioned flattened recess is at least one of the top and the bottom molds, the object is anyway achieved. However, when the degree of contraction of the top face or the bottom face is intended to increase, the deformation of diameter contraction and expanding of the rubber stopper can be caused with less hindrance by forming flattened recesses on both faces of the dies than by enlarging the volume of one recess. The above-mentioned sucking holes for fixing the rubber stopper may be opened on the inner faces of the flattened recesses. Further, when the flattened recess is formed on a die face opposing a die face to which the rubber stopper is tacked, it is preferable to provide vent holes for discharging air accompanied by the expansion deformation of the rubber stopper.

It is necessary that the volume of the above-mentioned flattened recess is enough to absorb an increase in the thickness of the rubber stopper (portion on the top face or the bottom face side deformed to expand) based on the diameter contraction of the bottom face or the top face of the rubber stopper. Further, it is easy to cause the increase (expansion deformation) in the thickness of the rubber stopper by the injection pressure over the area of the top face or the bottom face as wide as possible and accordingly, the larger the inner diameter of the flattened recess, the smaller the sufficient depth.

Therefore, the depth of recess is determined by a desired degree of diameter contraction and is not specified unconditionally. However, when the diameter of the top face or the bottom face of the rubber stopper is contracted by 1 through 10%, considering deformability based on material of the rubber stopper substantially 0.2 through 5 mm is preferable. When it is less than 0.2 mm, sufficient expansion of the rubber stopper is difficult and accordingly, the degree of diameter contraction is insufficient whereby the expected object is difficult to achieve. On the contrary the depth exceeding 5 mm is not of much meaning since the expansion deformation exceeding 5 mm is normally difficult to cause.

It is the simplest method to increase an injection molding pressure of the rubber stopper outer supporter as a method of causing the diameter contraction of the top face or the bottom face by applying a compressive stress on the side face of the barrel portion of the rubber stopper. However, there is a method of utilizing molding shrinkage property of synthetic resin by constituting in thick wall the top face side or the bottom face side of the rubber stopper of the rubber stopper outer supporter, which can preferably be utilized.

To control a desired value of the diameter of the top face or the bottom face of the rubber stopper in the range of the diameter contraction of 1 through 10%, a method of detecting the degree of deformation of the top face or the bottom face by strain gages is the most convenient other than a method of controlling the injection resin pressure. The desired diameter contraction degree can easily provided by previously calculating a relationship between a resin pressure in a die and a diameter contraction or strain received by gage terminals in the recess by the rubber stopper expanding into the recess of the die and conducting steps of setting and maintaining a predetermined resin pressure or strain value in injection molding, maintaining held pressure and cooling.

Provision of suction holes for fixing the abovementioned rubber stopper or vent holes is facilitated by constituting dies of which faces are in contact with or opposed to the top face or the bottom face of the rubber stopper by insertion dies. Further, when sintered bodies of permeable metal powder are used for the insertion dies, the provision of the suction holes for fixing or the vent holes is facilitated, which is a preferably adopted embodiment.

The cavity of the injection molding dies is constituted by dies on the top face side and the bottom face side of the rubber stopper and dies surrounding the barrel portion. It is preferable in view of uniform injection molding that gates for injection are placed outside of the barrel portion of the rubber stopper, on a plane in parallel with the top face and the bottom face and at the same interval.

Also, discharge holes for inner gas are necessary as in the case of normal injection molding.

Next, an explanation will be given of the present invention in reference to the drawings. However, the present invention is not restricted by the description of the drawings.

Figure 2:
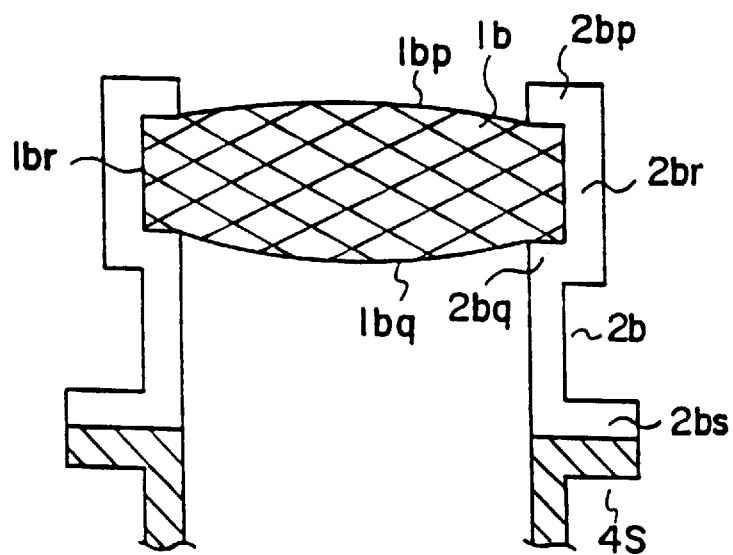
FIG. 2 is a longitudinal sectional view showing a state in which a stopper assembly where the rubber stopper of FIG. 1 is gripped by a rubber stopper outer supporter is molten and adhered to a tap of a container for aqueous infusion.
Figure 3:
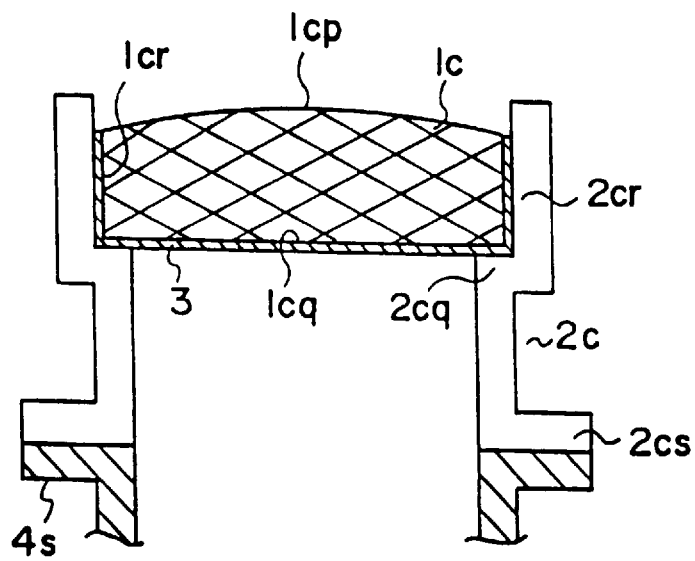
FIG. 3 is a longitudinal sectional view showing a state in which a stopper assembly where the rubber stopper of FIG. 1 laminated with a film is gripped by a rubber stopper outer supporter is molten and adhered to a tap of a container for aqueous infusion.
Figure 4:
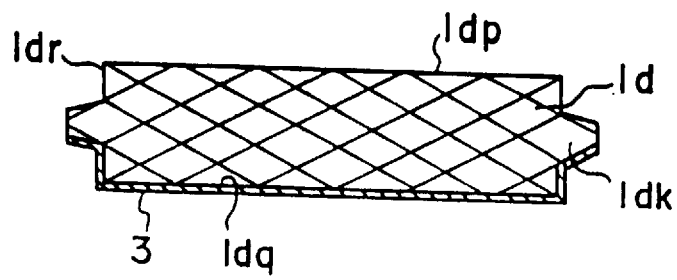
FIG. 4 is a longitudinal sectional view of the rubber stopper of FIG. 1 having a protruded portion on the side face of a barrel portion and laminated with a film.
Figure 5:
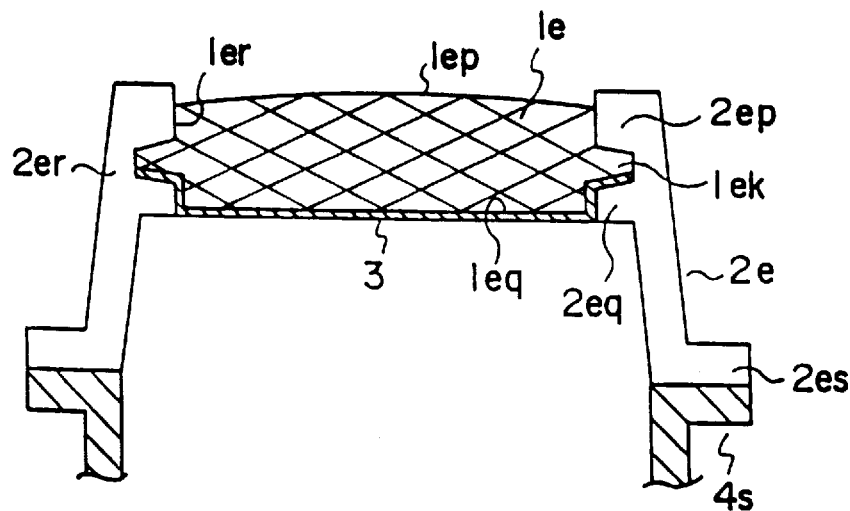
FIG. 5 is a longitudinal sectional view showing a state in which a stopper assembly where the rubber stopper of FIG. 4 is gripped by a rubber stopper outer supporter is molten and adhered to a tap of a container for aqueous infusion.
Figure 6:
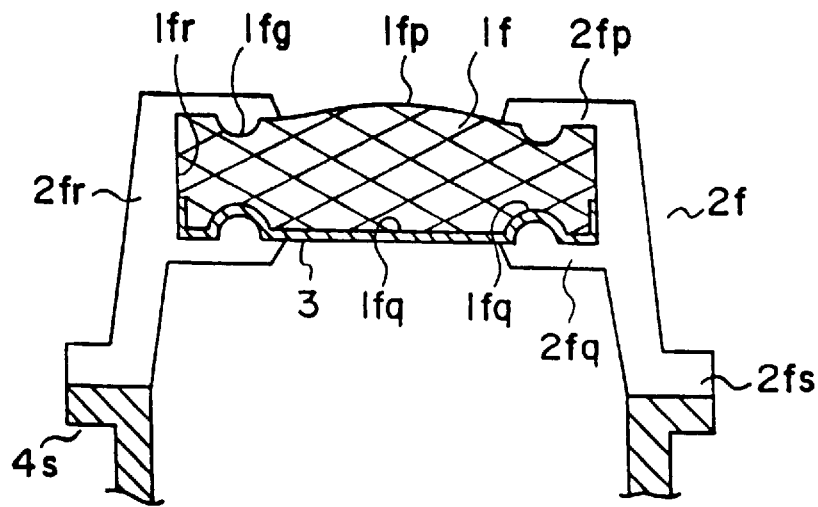
FIG. 6 is a longitudinal sectional view showing a state in which the rubber stopper of FIG. 1 having ring-like recess grooves on the top face and the bottom face and laminated with a film is gripped by a rubber stopper outer supporter and molten and adhered to a tap of a container for aqueous infusion.
Figure 7:
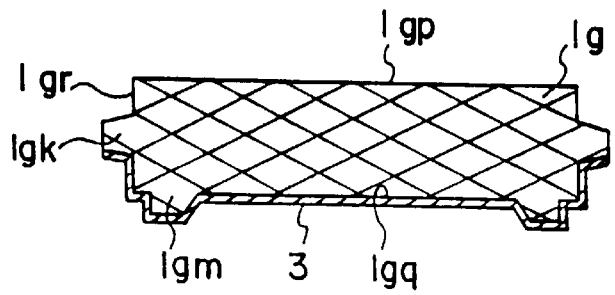
FIG. 7 is a longitudinal sectional view of the rubber stopper of FIG. 4 in which a ring-like rib is formed on the bottom face.
Figure 8:
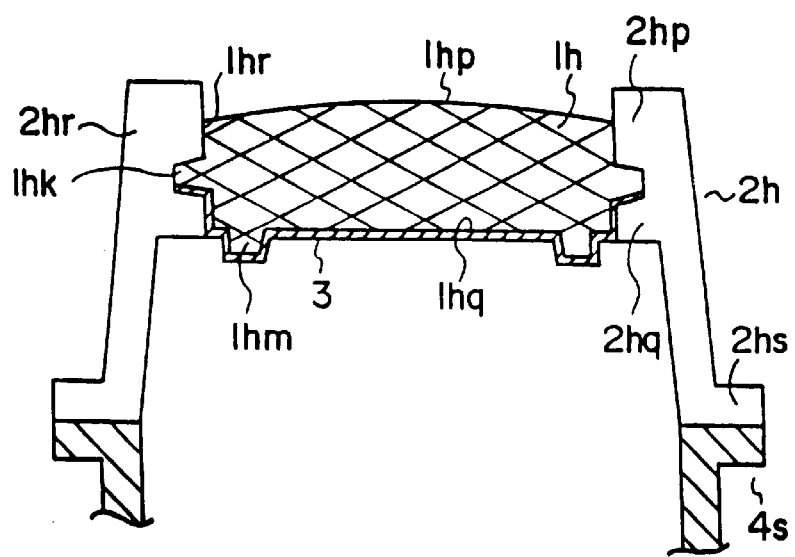
FIG. 8 is a longitudinal sectional view showing a state in which a stopper assembly where the rubber stopper of FIG. 7 is gripped by a rubber stopper outer supporter is molten and adhered to a container for aqueous infusion.
Figure 9:
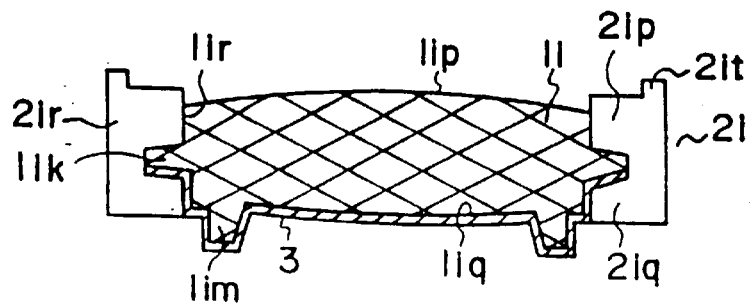
FIG. 9 is a longitudinal sectional view of a stopper assembly where the rubber stopper of FIG. 7 is gripped by a rubber stopper outer supporter.
Figure 10:
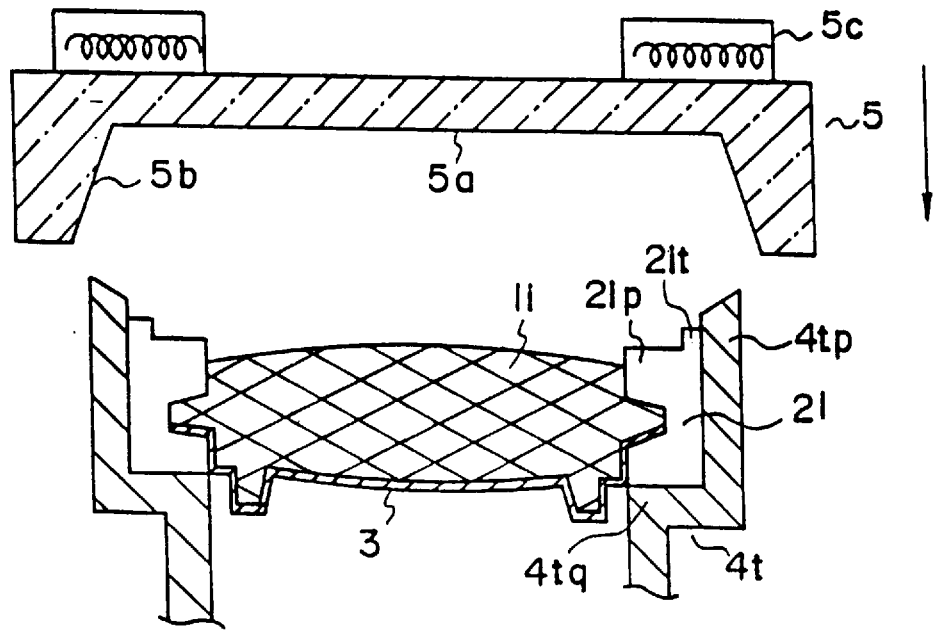
FIG. 10 is a longitudinal sectional view showing a state in which the stopper assembly of FIG. 9 is inserted to an opening of a container for aqueous infusion main body and a sealer is arranged.
Figure 11:
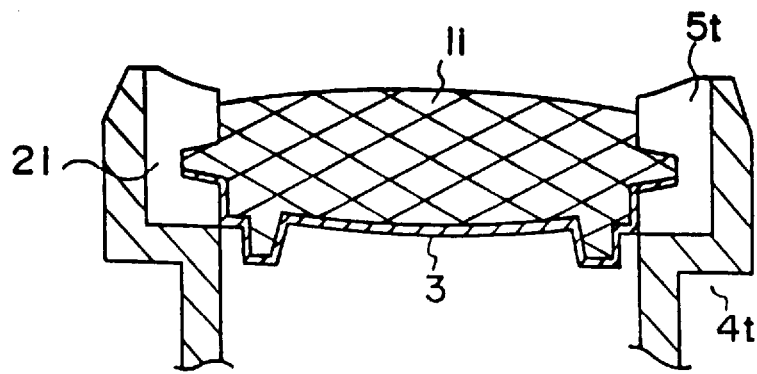
FIG. 11 is a longitudinal sectional view showing a state in which the stopper assembly is molten and integrated to the opening by the method illustrated in FIG. 10.
Figure 12:
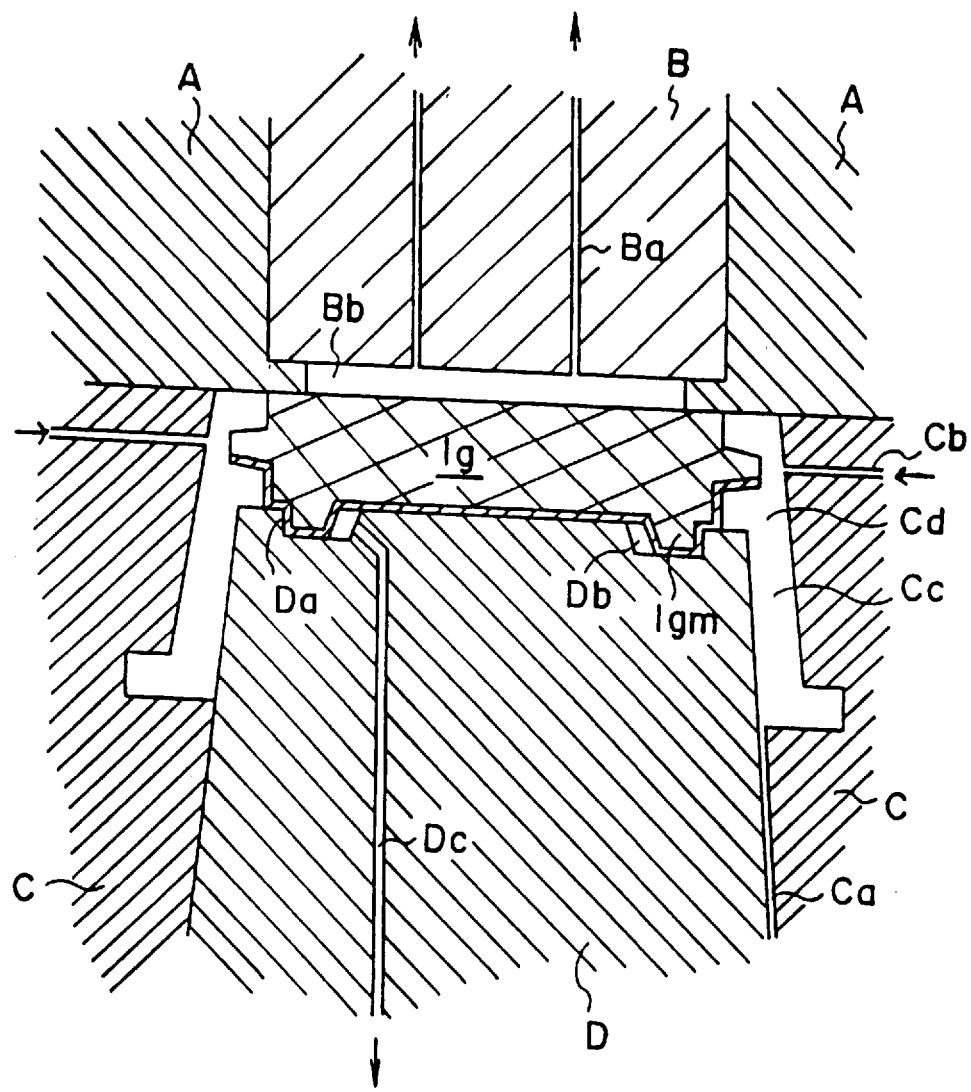
FIG. 12 is a longitudinal vertical view showing an example of a method of forming a stopper assembly in accordance with the present invention by subjecting it to an insert injection molding.
Figure 13:
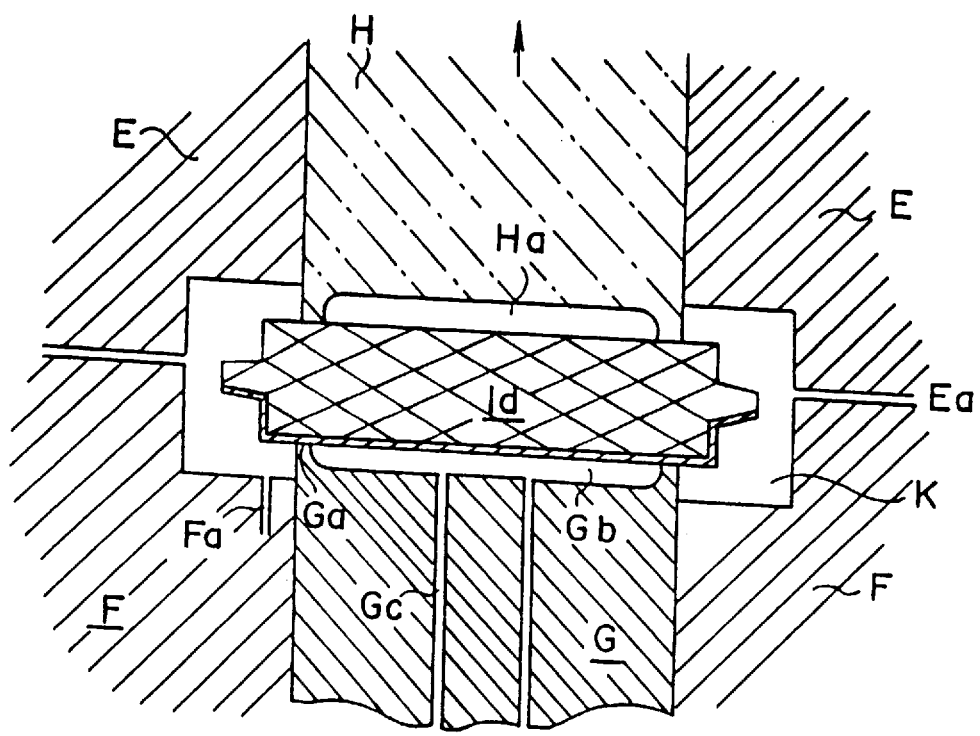
FIG. 13 is a longitudinal sectional view showing another example of a method of forming a stopper assembly in accordance with the present invention by subjecting it to an insert injection molding.

FIG. 1 is a longitudinal sectional view of a cylindrical rubber stopper 1a as an example of rubber stoppers used in the present invention, FIG. 2 is a longitudinal diagram showing a state in which a rubber stopper 1b the same as the rubber stopper of FIG. 1 is gripped by a rubber stopper outer supporter 2b which is molten and adhered to a tap of a container for aqueous infusion 4s, FIG. 3 is a longitudinal sectional view showing a state in which a rubber stopper 1c where the bottom face and the side face of the barrel portion of the rubber stopper of FIG. 1 are laminated with a synthetic resin film, is gripped by a rubber stopper outer supporter 2c which is molten and adhered to the tap of a container for aqueous infusion 4s, FIG. 4 is a sectional view of a rubber stopper 1d where a protruded portion is provided around the side face of the barrel portion of the rubber stopper of FIG. 1 and the film is laminated on the bottom face and a portion of the side face, FIG. 5 is a longitudinal sectional view showing a state in which a rubber stopper 1e the same as the rubber stopper of FIG. 4 is gripped by a rubber stopper outer supporter 2e which is molten and adhered to the tap of a container for aqueous infusion 4s, FIG. 6 is a longitudinal sectional view showing a state in which a rubber stopper 1f where ring-like recess grooves are formed on the top face and the bottom face of the cylindrical rubber stopper of FIG. 1 and the film is laminated on the bottom face and a portion of the side face, is gripped by a rubber stopper outer supporter 2f which is molten and adhered to the tap of a container for aqueous infusion 4s, FIG. 7 is a longitudinal sectional view of a rubber stopper 1g where a ring-like rib is formed further on the bottom face of the rubber stopper of FIG. 4, FIG. 8 is a longitudinal sectional view showing a state in which a rubber stopper 1h the same as the rubber stopper of FIG. 7 is gripped by a rubber stopper outer supporter 2h which is molten and adhered to the tap of a container for aqueous infusion 4s, FIG. 9 is a longitudinal sectional view showing a state in which a rubber stopper 1i the same as the rubber stopper of FIG. 7 is gripped by a rubber stopper outer supporter 2i located only at the side face of the barrel portion of the rubber stopper, FIG. 10 is a longitudinal sectional view showing a state in which the stopper assembly of FIG. 9 is inserted into a stopper assembly receive port 4t of the main body of the container for aqueous infusion and a heater is arranged, FIG. 11 is a longitudinal sectional view showing a state in which the stopper assembly is inserted into and integrated with the main body by the method as illustrated in FIG. 10, FIG. 12 is a longitudinal sectional view showing an example of a method in case where the stopper assembly in accordance with the present invention is subjected to an insert injection molding and FIG. 13 is a longitudinal sectional view showing another example of a molding method.

Figure 14:
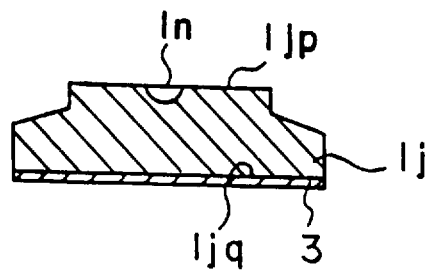
FIG. 14 is a longitudinal sectional view of a rubber stopper used in examples and comparative examples and laminated with a film.
Figure 15:
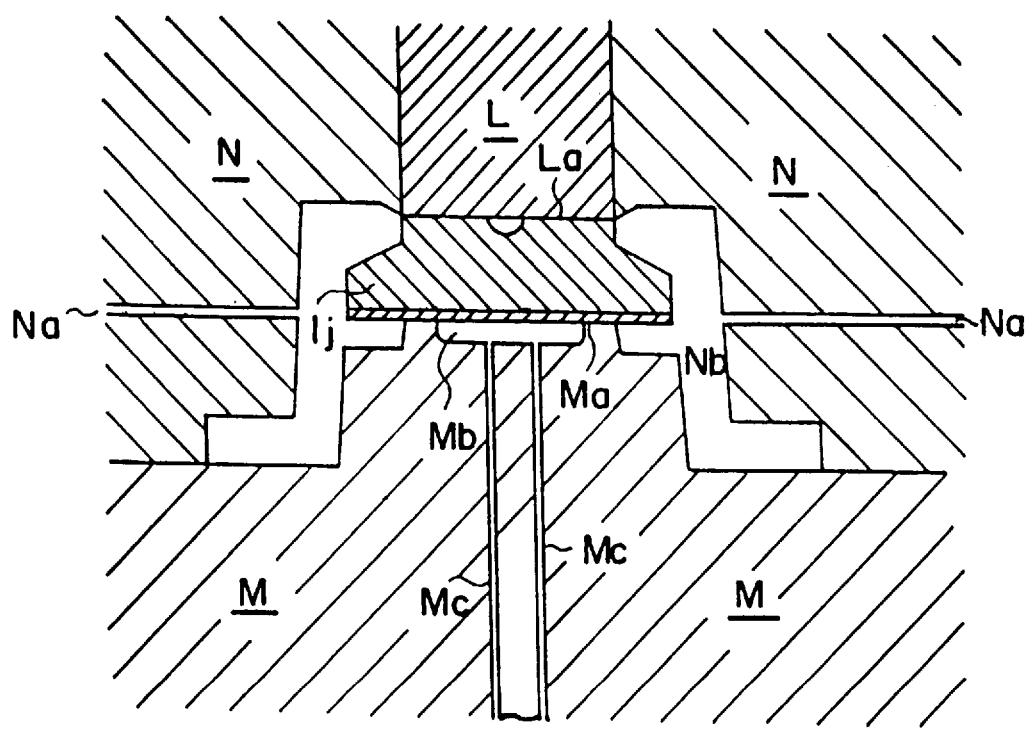
FIG. 15 is a longitudinal sectional view showing a state in which a rubber stopper is fixed between dies in only one on the bottom face side of the rubber stopper of which a flattened recess portion is provided.
Figure 16:
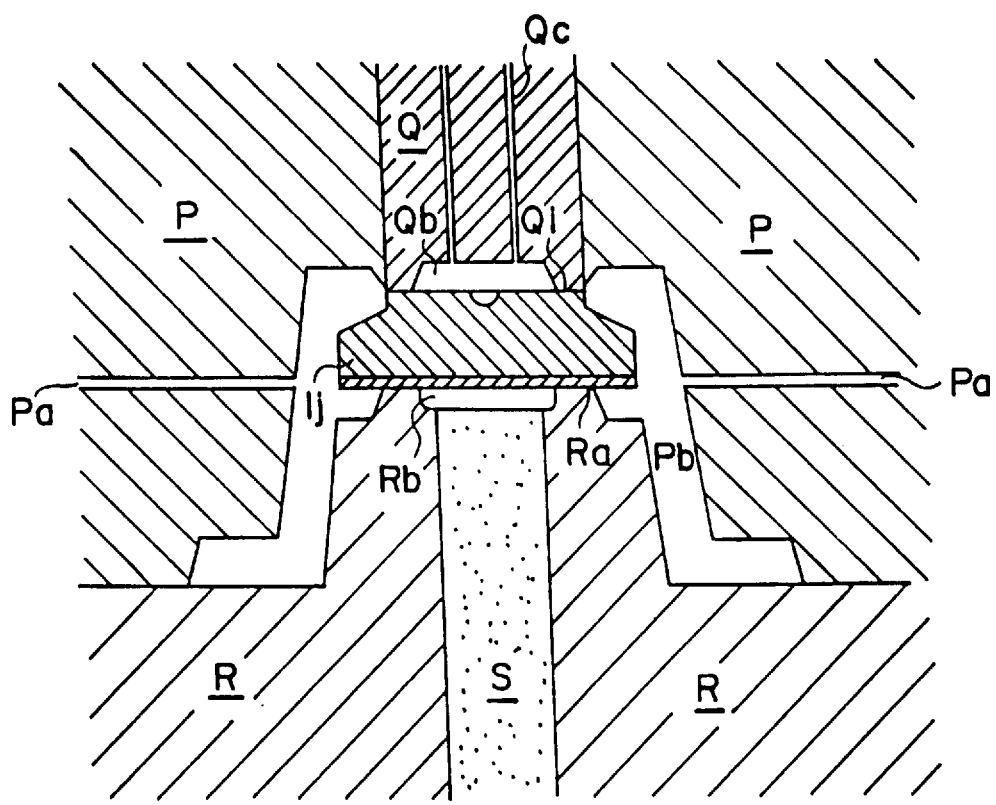
FIG. 16 is a longitudinal sectional view showing a state in which a rubber stopper is fixed between dies on the top face side of the rubber stopper and on the bottom face side thereof in which flattened recess portions are provided.
Figure 17:
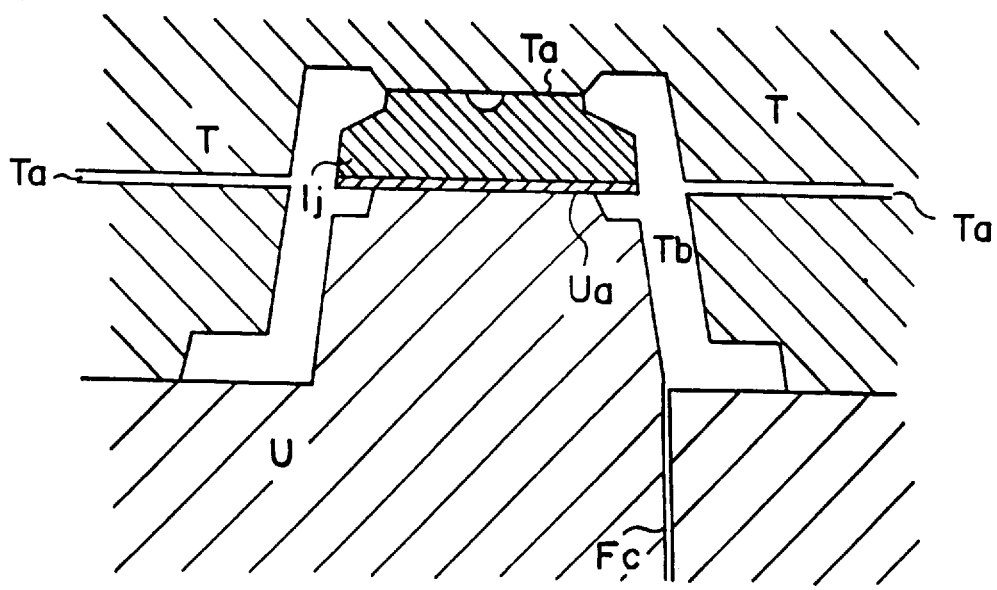
FIG. 17 is a longitudinal sectional view showing a state in which a rubber stopper is fixed between dies on the top face side of the rubber stopper and on the bottom face side thereof in which smooth surfaces are provided.

FIGS. 14 through 17 are drawings concerning Examples 1 through 6 and Comparative Examples 1 through 3. FIG. 14 is a longitudinal sectional view of a laminated rubber stopper used in these examples and the like, FIG. 15 is a longitudinal sectional view showing a state in which the rubber stopper of FIG. 14 is gripped and fixed in dies where a flattened recess is provided only at a die on the bottom face side of the rubber stopper, FIG. 16 is a longitudinal sectional view in a case where a flattened recess is also provided on a top face side die in FIG. 15 and FIG. 17 is a longitudinal sectional view in a case where no flattened recess is provided both on dies on the bottom face side and the top face side of the rubber stopper.

A detailed explanation will be given as follows.

The rubber stopper shown in FIG. 1 is an example of the simple cylindrical rubber stopper 1a that is illustrated in the longitudinal sectional view. The rubber stopper 1a is constituted by a top face lap, a bottom face 1aq and a barrel portion side face 1ar.

FIG. 2 illustrates a stopper assembly in a state where a rubber stopper 1b the same as that in FIG. 1 is used and a barrel portion side face 1br is gripped by a rubber stopper outer supporter 2b under compression. Under the compression a top face 1bp and a bottom face 1bq are deformed to expand. The deformation applies strong pressure on a needle pierced for aqueous infusion and contributes to strong closing of a hole after drawing the needle.

Meanwhile, to promote the integration of the rubber stopper and the rubber stopper outer supporter, not only a grip frame 2br is formed to the rubber stopper outer supporter 2b opposed to the barrel portion side face 1br of the rubber stopper but a reinforcement frame 2bp is formed opposed to an outer periphery on the top face side thereof and a reinforcement frame 2bq is formed opposed to an outer periphery on the bottom face side thereof. Further, the reinforcement frame 2bq opposed to the outer periphery on the bottom face side extends to the side of the container for aqueous infusion to melt and adhere to the tap of a container for aqueous infusion 4s and a flange 2bs is formed at the distal end. FIG. 2 shows the molten and adhered state.

FIG. 3 illustrates a stopper assembly in which a rubber stopper where a synthetic resin film 3 is laminated on a bottom face (side in contact with medical liquid) 1cq and a barrel portion side face 1cr of a rubber stopper 1c the same as the rubber stopper of FIG. 1, is used, a grip frame 2cr of a rubber stopper outer supporter 2c is formed opposed to the barrel portion side face of the rubber stopper and a reinforcement frame 2cq is formed opposed to an outer periphery of the bottom face, almost similar to the case of the FIG. 2. However, a reinforcement frame is dispensed with at a portion opposed to the top face of the rubber stopper since the rubber stopper 1c and the rubber stopper outer supporter 2c are integrated via the above-mentioned synthetic resin film. The rubber stopper outer supporter 2c is provided with on the side of the tap of a container for aqueous infusion 4s a flange 2cs which is molten and adhered to the container as in the case of FIG. 2. The top face 1cp is deformed to expand by the pressure from the barrel portion side face. A bottom face 1cq remains flat since it is made by a production method whereby no expansion deformation is caused.

FIG. 4 illustrates a rubber stopper 1d in which a protruded portion 1dk having a substantially trapezoidal section is formed at the central portion of a barrel portion side face 1dr of the rubber stopper 1d the same as the rubber stopper of FIG. 1 in which the synthetic resin film 3 the same as that in FIG. 3 is laminated on the total of a bottom face 1dq and a portion of the barrel portion side face. Notation 1dp designates a top face.

FIG. 5 illustrates a stopper assembly in which a rubber stopper 1e the same as that of FIG. 4 where the same film 3 is laminated on a bottom face 1eq and a portion of a barrel portion side face 1er, is used and a barrel portion side face 1er is gripped by a rubber stopper outer supporter 2e under pressure. The rubber stopper and the rubber stopper outer supporter are strongly in tight contact and portions of the laminated film are integrated therewith by melting and adhering. A protruded portion 1ek of the rubber stopper is in mesh with a top grip frame 2ep and a bottom grip frame 2eq of a grip frame 2er of the barrel portion side face of the rubber stopper outer supporter 2e and are strongly integrated under anchoring effect. As in the case of FIG. 3 the rubber stopper is deformed to expand to the side of a top face 1ep but the bottom 1eq remains flat. A flange 2es of the rubber stopper outer supporter is molten and adhered to the tap of a container for aqueous infusion 4s.

FIG. 6 illustrates a stopper assembly in which a rubber stopper where ring-like recess grooves 1fg are respectively formed at outer peripheries of a top face 1fp and a bottom face 1fq of a rubber stopper 1f the same as the cylindrical rubber stopper of FIG. 1 and the synthetic film 3 is laminated on the bottom face and a portion of a barrel portion side face 1fr and the barrel side face is gripped by a grip frame 2fr of a rubber stopper outer supporter 2f under pressure. Reinforcement frames 2fp and 2fq extending up to the above-mentioned ring-like recess grooves along the top face and the bottom face of the rubber stopper are formed in the rubber stopper outer supporter 2f and the rubber stopper and the rubber stopper outer supporter are strongly integrated by anchoring effect of the reinforcement frames to the ring-like recess grooves and by the melting and adhering via the above-mentioned film thereby constituting liquid tight sealing. A flange 2fs is formed in the rubber stopper outer supporter for melting and adhering to the tap of a container for aqueous infusion 4s as in the case of FIG. 5 and it is molten and adhered thereto.

FIG. 7 illustrates a rubber stopper 1g the same as the rubber stopper of FIG. 4 where a ring-like rib 1gm is formed at an outer periphery of a bottom face 1gq and which is constituted by a top face 1gp, the bottom face 1gp and a barrel portion side face 1gr. A protruded portion 1gk is formed on the barrel portion side face as in the case of FIG. 4. The synthetic resin film 3 similar to the above-mentioned is laminated on a portion of the barrel portion side face and the bottom face including the ring-like rib. This ring-like rib is effectively utilized in positioning and tacking the rubber stopper to die faces in an insert injection molding and is effective in preventing abnormal deformation of the rubber stopper as in piercing of a needle or the like.

FIG. 8 illustrates a stopper assembly in which a rubber stopper 1h the same as the rubber stopper of FIG. 7 similarly laminated with the synthetic resin film 3, is gripped by a supporter 2h the same as the rubber stopper outer supporter of FIG. 5 under pressure. The rubber stopper is constituted by a top face 1hp, a bottom face 1hq and a barrel portion side face 1hr, a ring-like rib 1hm is provided on the bottom face and the above-mentioned film 3 is laminated on the bottom face and a portion of the barrel portion side face. Also, the protruded portion 1hk is in mesh with a top grip frame 2hp and a bottom grip frame 2hq of a grip frame 2hr of the rubber stopper outer supporter and strongly integrated therewith under anchoring effect.

A flange 2hs is formed at the bottom side of the rubber stopper outer supporter as in FIG. 6 or the like and the flange is molten, adhered and integrated to the tap of a container for aqueous infusion 4s.

FIG. 9 illustrates a stopper assembly in which a rubber stopper outer supporter is constituted only by a grip frame and is not extended to the side of container for aqueous infusion as shown by FIG. 8. A rubber stopper 1i the same as the rubber stopper of FIG. 7 is used and is constituted by a top face 1ip, a bottom face 1iq and a barrel portion side face 1ir. A protruded portion 1ik similar to the above-mentioned is formed on the barrel portion side face and a ring-like rib 1im similar to the above-mentioned is formed on the bottom face, respectively and the film 3 similar to the above-mentioned is laminated on the bottom face and a portion of the barrel portion side face.

Also, the protruded portion 1ik is in mesh with a top grip frame 2ip and a bottom grip frame 2iq of a grip frame 2ir constituting a rubber stopper outer supporter 2i and is strongly integrated therewith under anchoring effect. A ring-like protrusion 2it is formed at an outer periphery of the top grip frame 2ip. The ring-like protrusion constitutes a melt portion in case where it is molten and integrated with a tap of a container for aqueous infusion, mentioned later.

FIG. 10 illustrates a state in which a stopper assembly where the rubber stopper 1i of FIG. 9 laminated with the film 3 similar to the above-mentioned is integrated with the rubber stopper outer supporter 2i and the top face and the bottom face are deformed to expand, is inserted into a stopper assembly receiving port 4t provided at the tap of the container for aqueous infusion. The stopper assembly receiving port is respectively provided with a stopper assembly receiving portion 4tq at the bottom end and an elongated portion 4tp elongated upwardly longer than the ring-like protrusion 2it of the rubber stopper outer supporter. The elongated portion is a portion contributing to liquid tight sealing for the stopper assembly and the stopper assembly receiving port along with the above-mentioned ring-like protrusion.

The above-mentioned liquid tight sealing of the stopper assembly and the stopper assembly receiving port is achieved by pressing thereto a melt sealer 5 arranged at the top portion of FIG. 10 and movable in the arrow mark direction. That is, the sealer has a heater 5c and is provided with a recess for melting and integrating the rubber stopper outer supporter and the stopper assembly receiving port. The recess is constituted by a bottom 5a and a slanted side face 5b. By pressing the sealer the elongated portion 4t of the stopper assembly receiving port is made flow inwardly in molten state and meanwhile also the ring-like protrusion 2it of the top grip frame is rendered in a molten state and both form a molten portion 5t.

FIG. 11 illustrates a state where the molten portion 5t is formed. As illustrated, when the pressing force is strong, the molten portion spreads up to the top face of the top grip frame. However, the object of the liquid tight sealing performance is not deteriorated thereby at all. In FIG. 11, notation 1i designates the rubber stopper, numeral 3 designates the synthetic resin film, notation 2i designates the rubber stopper outer supporter, notation 4t designates the stopper assembly receiving port and notation 5t designates the molten portion, respectively.

FIG. 12 illustrates an example of methods of manufacturing stopper assemblys (similar to the stopper assembly of FIG. 8) in accordance with the present invention.

FIG. 12 illustrates a state in which a rubber stopper 1g laminated with a synthetic resin film is inserted into an insert injection molding die comprising split dies A,B,C and D and a state before resin for the rubber stopper outer supporter is injected into a cavity Cc is shown.

The die B is integrated to the die A as an insertion die. Although the die A is slidably in contact with an outer periphery of the top face of the rubber stopper 1g, the die B is not in contact therewith and accordingly, a space Bb is formed in a flattened recess shape on the top face side of the rubber stopper creating a state where expansion deformation of the top face can be accommodated. The above-mentioned slidability between the die A and the top of face of the rubber stopper 1g is a necessary condition in case where a compressive stress is applied on the barrel portion side face of the rubber stopper and a diameter of the top face is contracted.

Further, vent holes Ba in the die B for exhaustion are provided and air in the flattened recess Bb can be exhausted during the above-mentioned expansion deformation.

The die C is at the side face portion and injection gates Cb injecting resin in the arrow mark direction are provided at the same height and the same interval. Notation Ca designates a vent hole for injection molding.

The mold D is a mold arranged on the bottom face side of the rubber stopper where a ring-like groove Da is provided and a ring-like rib 1gm of the rubber stopper is inserted into the ring-like groove by which positioning and tacking are carried out. However, it is necessary that the width of the ring-like groove is larger than the width of the ring-like rib such that sliding and movement by diameter contraction can be performed in the diameter contraction of the bottom face of the rubber stopper when the barrel portion side face of the rubber stopper receives a compressive stress. It is the most preferable that a space Db is provided and the fitting and positioning are carried out between the inner wall of the outer side of the ring-like groove Da and the outer wall face of the ring-like rib 1gm. Further, the ring-like rib and the bottom face of the ring-like groove must be slidable therebetween. The exhaustion accompanied by the diameter contraction of the bottom face of the rubber stopper is carried out via a vent hole Dc and the vent hole is utilized for sucking and fixing in tacking and fixing the rubber stopper.

The resin injected into the cavity Cc can apply a compressive stress to the barrel portion side face of the rubber stopper at a portion of the cavity Cd and contract the diameter at a predetermined pressure.

FIG. 13 illustrates another example of a method of manufacturing a stopper assembly (similar to the stopper assembly of FIG. 4) in accordance with the present invention.

An injection molding die is constituted by split dies E,F,G and H. An insertion die H that is a sintered body of metal powder is integrated to the central portion of the die E. Fine gas passages are formed in the sintered body and accordingly, it is not necessary to newly form permeable vents as in the vent holes Ba and the vent or sucking hole Dc in FIG. 12.

A flattened recess Ha is formed on a face of the die H opposed to the rubber stopper 1d and the outer periphery of the flattened recess is slidably in contact with the rubber stopper. The contact relationship is for expecting an effect the same as that in the case of FIG. 12. The top face is deformed to expand into the flattened recess by receiving a compressive stress from the barrel portion side face of the rubber stopper and inner air is exhausted in the arrow mark direction via fine passages in the die H.

A flattened recess Gb is formed on a face Ga opposed to the rubber stopper and the rubber stopper is tacked to the surface of the die G by sucking air from suction holes Gc for fixing that are opened on the bottom face of the recess.

Synthetic resin is injected from injection gates Ea formed by the dies E and F to a cavity K for molding a rubber stopper outer supporter. At a predetermined pressure or more a compressive stress is applied on the barrel portion side face of the rubber stopper and the diameter of the rubber stopper is contracted. The volume change corresponding thereto is absorbed by the expansion deformation of the rubber stopper to the flattened recesses Ha and Gb.

According to this molding method the diameters of the top face and the bottom face of the rubber stopper are contracted and the top face and the bottom face are deformed to expand.

Further, notation Fa designates a vent hole for injection molding.

As mentioned above the stopper assembly for a container for aqueous infusion in accordance with the present invention is provided with a structure integrally molded by the rubber stopper, preferably the rubber stopper laminated with the synthetic resin film at least on the bottom face and/or the side face and the rubber stopper outer supporter made of synthetic resin and formed at least on all the side face of the barrel portion of the rubber stopper. Further, a uniform compressive stress is applied on the rubber stopper outer supporter from the total side face of the barrel portion toward the center portion by which the dimension of the outer diameter of the rubber stopper per se is reduced and on the other hand the thickness is increased. Accordingly, a state where elasticity of rubber of the rubber stopper is promoted, is provided.

Further, according to the method of making the stopper assembly in accordance with the present invention the rubber stopper can simply be integrated with the rubber stopper outer supporter in compression state and it can be provided by a single stage of injection molding.

EXAMPLES

A rubber stopper for a container for aqueous infusion prescribed by the Japanese Pharmacopoeia, having a sectional shape as shown in FIG. 14, laminated with a high-density polyethylene film 3 only at a bottom face 1jq and having a thickness of 7±0.3 mm (average thickness=7 mm), was used. A recess 1n formed on a top face 1jp is provided with a circular opening, normally called dimple and is rendered a yardstick for a piercing location of an injection needle or a piercing needle for aqueous infusion and a single or a plurality thereof are formed.

(Example 1)

The laminated rubber stopper 1j having a thickness of 7.3 mm (measured value) was inserted into an injection molding die comprising split dies N, L and M shown in FIG. 15 (Split dies N and L were assembled and already integrated. Hereinafter, they are designated as a split mold N (L).) and was put between the split dies N (L) and M. A cavity Nb is formed by these split dies. A space other than the space occupied by the rubber stopper is an injection space for synthetic resin for molding the rubber stopper outer supporter. Injection gates Na are provided in the split die N(L) at left and right symmetrical positions and a portion thereof opposed to the top face of the rubber stopper is constituted by a smooth die face La of the insertion die L. The split die M is provided with a die face Ma in a closed-ring shape and having a smooth surface at a portion opposed to the bottom face of the rubber stopper. A flattened recess Mb having a depth of 0.40 mm is formed in the closed-ring and the gap between the die surfaces La and Ma is 6.9 mm. The rubber stopper was mounted on the split die M, the bottom face of the rubber stopper was fixed on the die face Ma in a closed-ring shape by pressure reduction through suction holes Mc for fixing that are opened on the bottom face of the flattened recess Mb and thereafter, the split die N(L) was integrated thereby completing positioning in injection molding.

High-density polyethylene was injected into the cavity Nb from the gates Na by a normal injection molding process, the rubber stopper was deformed to expand to the flattened recess Mb on the bottom face side by compressing it from all the side face and the peripheral portion of the bottom face and a stopper assembly integrated with the rubber stopper and the rubber stopper outer supporter was molded.

The obtained stopper assembly was molten and fixed to an opening of a aqueous infusion bag filled with 1 liter of isotonic sodium chloride solution, subjected to a bacteria reducing treatment by high-pressure heated vaporized water under conditions of 100° C.×30 min and subjected to function evaluating tests (bubble leakage test and liquid leakage test) as a stopper assembly for a container for aqueous infusion by testing methods, mentioned later. Further, at the same time outlook evaluation of the rubber stopper and measurement of diameter contraction rate of the rubber stopper were carried out.

The result is shown in Table 1.

(Example 2)

Evaluation and measurement were carried out similar to those in Example 1 except a laminated rubber stopper having a thickness of 6.7 mm (measured value) was used in place of the rubber stopper in Example 1 and a flattened recess Mb of the split die M having a depth of 5.00 mm was used.

The result is shown in Table 1.

(Example 3)

The laminated rubber stopper 1j having a thickness of 6.7 mm (measured value) was inserted into an injection molding die comprising split dies P,Q,R and S shown in FIG. 16 (Split dies P and Q are assembled and already integrated. Hereinafter, they are designated as a split die P(Q).) and was put between the split molds P (Q) and R. A cavity Pb is formed by these split dies. A space other than the space occupied by the rubber stopper is an injection space of synthetic resin for molding a rubber stopper outer supporter. The split die P(Q) is provided with injection gates Pa at left and right symmetrical positions, a portion thereof opposed to the top face of the rubber stopper is formed by an insertion die Q, the surface of the die Q is provided with a smooth die face Qa in a closed-ring shape, a flattened recess Qb having a depth of 1.00 mm is formed in the closed-ring and gas vent holes Qc capable of opening and closing are provided on the bottom face of the flattened recess Qb. The gas vent holes are in a closed state. Meanwhile, a portion of the split die R opposed to the bottom face of the rubber stopper is provided with a die surface Ra in a closed-ring shape having a smooth surface and a flattened recess Rb having a depth of 0.25 mm is formed in the closed-ring. The bottom of the flattened recess Rb is formed by an insertion die S, the insertion die S is constituted by a permeable sintered body of metal fine powder and gas in the flattened recess Rb can be sucked and removed.

The gap between the die surfaces Qa and Ra was 6.9 mm. The rubber stopper was mounted on the split die R, gas in the flattened recess Rb was sucked and pressure was reduced by utilizing the permeability of the split die S of the bottom face of the flattened recess Rb, the bottom face of the rubber stopper was fixed in air tight to the die surface Ra in a close-ring shape and the split die P(Q) was integrated to the split die R thereby completing positioning in injection molding.

High-density polyethylene was injected from the gate Pa into a cavity Pb by a normal injection molding process, the rubber stopper was deformed to expand to the flattened recesses Qb and Rb on the top face side and the bottom face side by compressing it from all the side face and an outer periphery of the bottom face and a stopper assembly integrated with the rubber stopper and the rubber stopper outer supporter was molded.

After subjecting the obtained stopper assembly to a retort treatment as in the Example 1 various evaluation and measurement were performed.

The result is shown in Table 1.

(Example 4)

Evaluation and measurement were performed as in Example 3 except a laminated rubber stopper having a thickness of 7.0 mm (measured value) was used in place of the rubber stopper in Example 3 and a flattened recess Rb of the split die R having a depth of 1.00 mm was used.

The result is shown in Table 1.

(Example 5)

Evaluation and measurement were performed as in Example 4 except a laminated rubber stopper having a thickness of 7.3 mm (measured value) was used in place of the rubber stopper in Example 3 and a flattened recess Rb of the split die R having a depth of 5.00 mm was used.

The result is shown in Table 1.

(Example 6)

Evaluation and measurement were performed as in Example 5 except a flattened recess Rb of the split die R in Example 5 having a depth of 0.20 mm was used and the gas vent holes Qc on the bottom face of the flattened recess Qb was rendered an open state.

The result is shown in Table 1.

COMPARATIVE EXAMPLES (Comparative Example 1)

Evaluation and measurement were performed as in Example 1 except a laminated rubber stopper having a thickness of 6.7 mm (measured value) was used in place of the rubber stopper in Example 1 and a flattened recess Mb of the split die M having a depth of 7.50 mm was used.

The result is shown in Table 1.

(Comparative Example 2)

A laminated rubber stopper having a thickness of 6.7 mm (measured value) was used in place of the rubber stopper in Example 1, inserted into an injection molding die comprising split dies U and T shown in FIG. 17 and put between the split dies. A cavity Tb is formed by the two split dies. A space other than a space occupied by the rubber stopper is an injection space of synthetic resin for molding a rubber stopper outer supporter. The split die T is provided with injection gates Ta at left and right symmetrical positions and smooth die surfaces Ta and Ua are formed at portions opposed to the top face and the bottom face of the rubber stopper.

The gap between the die surfaces Ta and Ua was 6.9 mm. The rubber stopper was mounted between the both split dies T and U by which positioning in injection molding was completed.

High-density polyethylene was injected from the gates Ta into the cavity Tb by a normal injection molding process and a stopper assembly integrated with the rubber stopper outer supporter was molded under pressure from all the side face and an outer periphery of the bottom face of the rubber stopper.

The obtained stopper assembly was subjected to a bacteria reduction treatment by high-pressure heated vaporized water as in Example 1 and thereafter various evaluation and measurement were performed.

The result is shown in Table 1.

(Comparative Example 3)

Evaluation and measurement were performed as in Comparative Example 2 except a laminated rubber stopper having a thickness of 6.7 mm (measured value) was used in place of the rubber stopper in Comparative Example 2.

STOPPER ASSEMBLY FUNCTION EVALUATING TEST METHODS (Bubble Leakage Test)

A plastic needle (made by Terumo Corporation) for aqueous infusion having an outer diameter of 4.2 mm is pierced ("first piercing") into one of a plurality of dimples on the surface of a rubber stopper in a stopper assembly for a container for aqueous infusion in accordance with the present invention. The needle is once drawn out. Thereafter, while the needle is again pierced into another dimple ("second piercing"), the plug portion is maintained in a state where it is sunk approximately 1 cm below water level, pressurized air is introduced into a container for aqueous infusion via a tube connected to the back end of the pierced needle, the inside of the container is pressurized to an inner pressure of 0.4 kgf/cm$^2$, the state is maintained as it is for 1 min, generation of bubbles from the first pierced hole and the surrounding of the needle in piercing state during that period (air leakage under pressure) is observed and thereafter, air leakage after drawing out the needle is observed by drawing out the needle.

(Liquid Leakage Test)

A plastic needle (made by Terumo Corporation) for a aqueous infusion having an outer diameter of 4.2 mm is pierced into one of a plurality of dimples on the surface of a rubber stopper of a stopper assembly for a container for aqueous infusion in accordance with the present invention ("first piercing") and the needle is drawn out. Thereafter, the needle is again pierced into another dimple ("second piercing") and a tube connected the pierced needle is blocked by a cramp. The container for aqueous infusion is hung with the stopper portion in downward direction and left for 6 hours by hanging a weight of 500 g from the tube. The presence or absence of liquid leakage from a needle-pierced hole of the first piercing and liquid leakage from the surrounding of the needle in the second piercing state, the presence or absence of coming off of the needle during that period are observed. After elapse of the above-mentioned 6 hours the needle is drawn out and the presence or absence of liquid leakage from the hole after drawing out the needle is observed.

According to the present invention a stopper assembly in a state where the diameter is contracted by being applied with a compressive stress from all the side face of the barrel portion of a rubber stopper, is provided by deforming it to expand to a recess portion formed on a die face opposed to a top face or a bottom face of the rubber stopper. As a result, a state where a compressive stress is always present in the rubber stopper is provided. Even if a needle is pierced into the rubber stopper, not only liquid leakage or air leakage from the surrounding of the needle is not observed owing to a large pressing force on the needle but no liquid leakage is present from a needle-pierced hole even if the needle is drawn out under a state where liquid is put into a container. Further, even if a drawing stress is applied on the needle, the needle does not come off so far as it is not an abnormally large force.

Further, according to the method of making a stopper assembly in accordance with the present invention the rubber stopper can simply be integrated with a rubber stopper outer supporter under compression state, the above-mentioned stopper assembly for a container for aqueous infusion can be provided by a single stage of injection molding step and conventional complicated steps are dispensed with.

TABLE 1(a)

| | | Rubber stopper bottom face side die | | | Rubber stopper top face side die | | | | Laminated rubber stopper |
|---|---|---|---|---|---|---|---|---|---|
| | | Name of Die | Flattened recess | Depth (mm) | Name of Die | Flattened recess | Depth (mm) | Vent Hole | thickness (mm) |
| Examples | | | | | | | | | |
| | 1 | M | Present | 0.40 | N(L) | Non Present | — | — | 7.3 |
| | 2 | M | Present | 5.00 | N(L) | Non Present | — | — | 6.7 |
| | 3 | R | Present | 0.25 | P(Q) | Present | 1.00 | Closed | 6.7 |
| | 4 | R | Present | 1.00 | P(Q) | Present | 1.00 | Closed | 7.0 |
| | 5 | R | Present | 5.00 | P(Q) | Present | 1.00 | Closed | 7.3 |
| | 6 | R | Present | 0.20 | P(Q) | Present | 1.00 | Present | 7.3 |

TABLE 1(a)-continued

|  | Rubber stopper bottom face side die | | | Rubber stopper top face side die | | | | Laminated rubber stopper |
|---|---|---|---|---|---|---|---|---|
|  | Name of Die | Flattened recess | Depth (mm) | Name of Die | Flattened recess | Depth (mm) | Vent Hole | thickness (mm) |
| Comparative Examples | | | | | | | | |
| 1 | M | Present | 7.50 | N(L) | Non Present | — | — | 6.7 |
| 2 | U | Non Present | 0.00 | T | Non Present | — | ˄ | 6.7 |
| 3 | U | Non Present | 0.00 | T | Non Present | ˄ | ˄ | 7.3 |

TABLE 1(b)

| | | | Function evaluating test of stopper assembly | | | | | |
|---|---|---|---|---|---|---|---|---|
| | | | Air leakage test | | | Needle come off/Liquid leakage test | | |
| | Outlook of rubber stopper | Outer diameter contraction rate*1 (%) | First pierced hole | Surrounding of second pierced hole | Immediately after drawing second pierced needle | First pierced hole | Surrounding of second pierced hole | Needle come off | Immediately after drawing second pierced needle |
| Examples | | | | | | | | | |
| 1 | Fair | 1.94 | o | o | o | o | o | Non present | o |
| 2 | Fair | 4.94 | o | o | o | o | o | Non present | o |
| 3 | Fair | 3.06 | o | o | o | o | o | Non present | o |
| 4 | Fair | 3.61 | o | o | o | o | o | Non present | o |
| 5 | Fair | 5.56 | o | o | o | o | o | Non present | o |
| 6 | Fair | 3.83 | o | o | o | o | o | Non present | o |
| Comparative examples | | | | | | | | | |
| 1 | Large deformation | — | — | — | — | — | — | — | — |
| 2 | Center deviation | 0.56 | Δ | o | Δ | Δ~o | Δ~o | Come off after 5 hours | x |
| 3 | Fair | −3.5*2 | x | Δ | x | x | x | Come off after 30 minutes | x | o: No leakage occurrence
Δ: Very little leakage may occur from pierced hole. Furthermore, much leakage continues for several minutes after drawing needle
x: Leakage does not stop.
*1: Measured by change rate of outer diameter of dimple on top face of rubber stopper.
*2: Negative numerical value signifies expansion of outer diameter of rubber stopper.

What is claimed is:

1. A stopper assembly in a container, comprising:
   a cylindrical shaped stopper having a side face, a top face, and a bottom face, and constructed of an elastically deformable material; and
   a stopper supporter that supports said cylindrical shaped stopper by contacting said cylindrical shaped stopper on said side face, and at least a part of an outer peripheral portion of both of said top and bottom faces;
   wherein said stopper supporter imparts a compressive stress deforming said cylindrical shaped stopper such that said side face is contracted and said top and bottom faces are expanded outward.

2. The stopper assembly according to claim 1, wherein:
   said container and said stopper supporter are constructed of a synthetic resin; and
   said side face is contracted by said compressive force in an amount of at least 1%.

3. The stopper assembly according to claim 2, further comprising a ring-shaped rib provided at an outer periphery of at least one of said top and bottom faces.

4. The stopper assembly according to claim 2, wherein said stopper supporter has a distal end adhered to said container by moltenly fusing said distal end to said container.

5. The stopper assembly according to claim 1, further comprising:
   an extruding portion located around a central portion of said side face and having a diameter larger than either of said top and bottom faces.

6. The stopper assembly according to claim 5, further comprising:
   a groove located at an inside periphery of said stopper supporter;
   wherein said extruding portion is fitted within said groove.

7. The stopper assembly according to claim 6, further comprising a ring-shaped rib provided at an outer periphery of at least one of said top and bottom faces.

8. The stopper assembly according to claim 1, further comprising:

at least one ring-shaped recess groove provided at an outer periphery of at least one of said top and bottom faces;

wherein an outer portion of said cylindrical shaped stopper, including said side face, receives said compressive stress imparted by said stopper supporter.

9. The stopper assembly according to claim 2, further comprising:

a film laminated on at least one of said bottom face and said side face;

wherein said laminated film and said stopper supporter are moltenly adhered together at at least one portion of the cylindrical shaped stopper and said stopper supporter.

10. The stopper assembly according to claim 8, wherein:

a first of said at least one ring-shaped recess groove is provided on said bottom face; and said stopper supporter includes a bottom reinforcement frame extending from said stopper supporter to at least said ring-shaped recess groove on said bottom face.

11. The stopper assembly according to claim 10, wherein:

a second of said at least one ring-shaped recess groove is provided on said top face; and said stopper supporter includes a top reinforcement frame extending from said stopper supporter to at least said ring-shaped recess groove on said top face.

12. The stopper assembly according to claim 11, further comprising:

a first recess protrusion extending from said bottom reinforcement frame and fitted into said ring-shaped recess groove on said bottom face; and a second recess protrusion extending from said top reinforcement frame and fitted into said ring-shaped recess groove on said top face.

13. The stopper assembly according to claim 12, wherein:

said container and said stopper supporter are constructed of a synthetic resin; and said stopper supporter has a distal end adhered to said container by moltenly fusing said distal end to said container.

14. The stopper assembly according to claim 1, wherein said stopper supporter includes a flange at a distal end thereof.

15. The stopper assembly according to claim 14, wherein:

said container and said stopper supporter are constructed of a synthetic resin; and said distal end of said stopper supporter is adhered to said container by moltenly fusing said flange to said container.

* * * * *